Figure 1:
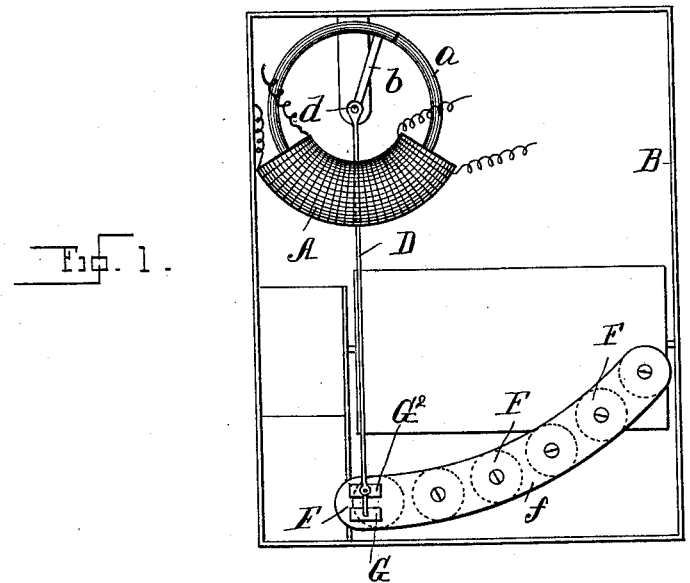

(No Model.) 3 Sheets—Sheet 1.

J. W. T. OLÁN.
ELECTRIC CURRENT RECORDER.

No. 518,534. Patented Apr. 17, 1894.

Witnesses
Willis B Magruder
J. L. Curtis

Inventor
J. W. Th. Olán (No Model.) 3 Sheets—Sheet 2.
J. W. T. OLÁN.
ELECTRIC CURRENT RECORDER.

No. 518,534. Patented Apr. 17, 1894.

Witnesses
Willis B Magruder
J L Curtis

Inventor
J. W. Th. Olán (No Model.)  3 Sheets—Sheet 3.
J. W. T. OLÁN.
ELECTRIC CURRENT RECORDER.
No. 518,534. Patented Apr. 17, 1894.
Fig. 7.
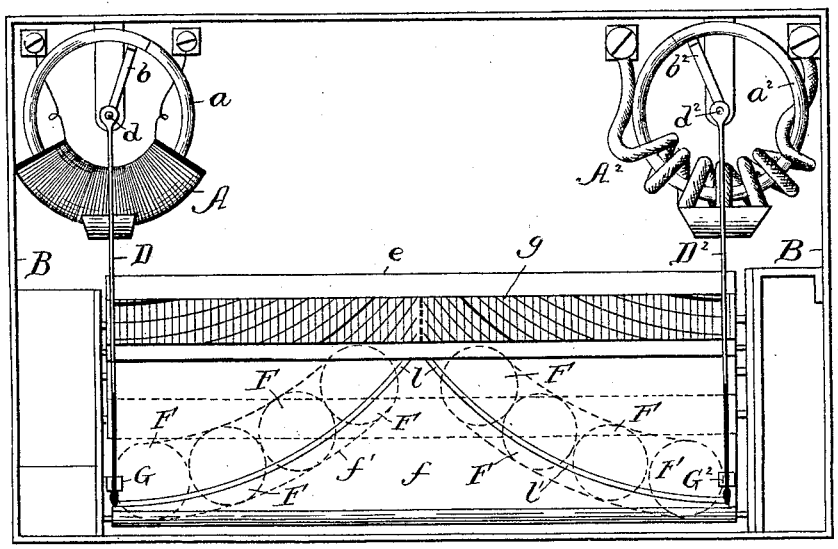
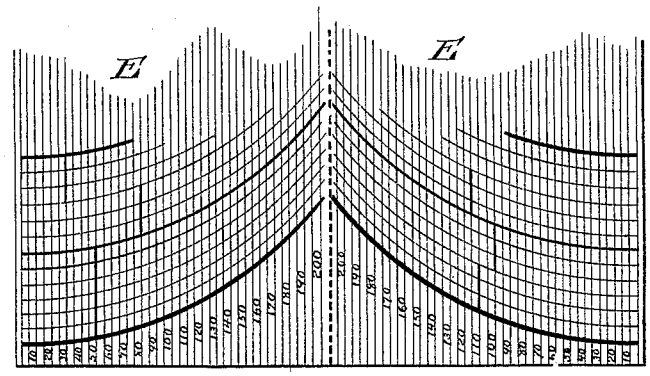
Fig. 8.
Witnesses:
J. B. McGinn.
H. D. Orr.
Inventor:
Johan W. Th. Olán

UNITED STATES PATENT OFFICE.

JOHAN W. TH. OLÁN, OF NEW YORK, N. Y.

ELECTRIC-CURRENT RECORDER.

SPECIFICATION forming part of Letters Patent No. 518,534, dated April 17, 1894.

Application filed July 7, 1892. Serial No. 439,277. (No model.)

*To all whom it may concern:*

Be it known that I, JOHAN W. TH. OLÁN, a subject of the King of Sweden and Norway, and a resident of New York, in the county of New York and State of New York, have invented certain new and useful Improvements in Electric-Current Recorders, of which the following is a specification.

My invention relates to apparatus for recording the current used or flowing in any electrical circuit.

It has for its object to provide means for recording and indicating the quantity as well as the tension of a certain current so that thereby the whole of Ohm's law, with relation to said current under a certain period of time, will be determined; thus enabling interested parties to account not only for all regular conditions of a current during a certain duration of time but also for variations and irregularities in connection therewith, for instance too high or too low tension leakage between the mains, &c.

Another object of the invention is to provide improved means for making impressions on a record sheet for the purpose in question.

The invention consists in the improved recorder and the novel details and combinations of parts hereinafter specified and claimed.

In carrying out my invention I use one coil or electro-magnet that is connected in suitable manner to the circuit, whose current is to be recorded, and a needle or pointer to be moved by said coil or magnet over a record sheet which is to receive impressions or the like from said needle or pointer. Said needle is to indicate and record ampères or quantity of current used and therefore necessary arrangements are made for that purpose. In conjunction with the foregoing, I also utilize another coil with a substantially similar needle or pointer to be moved over the record sheet and produce impressions on said sheet so as to indicate volts or the intensity of the current, for which purpose also necessary means are provided. The record sheet is to be provided with lines and figures to indicate the quantity and tension of the current, and is also to be moved by a suitable time mechanism whereby the duration of the current recorded will be determined. By this means when the quantity as well as the tension of the current that have passed through the circuit in a given time are shown on the record sheet, the corresponding resistance is practically known and the whole of Ohm's law with relation to the current in the circuit is therefore practically recorded.

For a more particular illustration of means for carrying out my invention, I hereby refer to the accompanying drawings, wherein—

Figure 2:
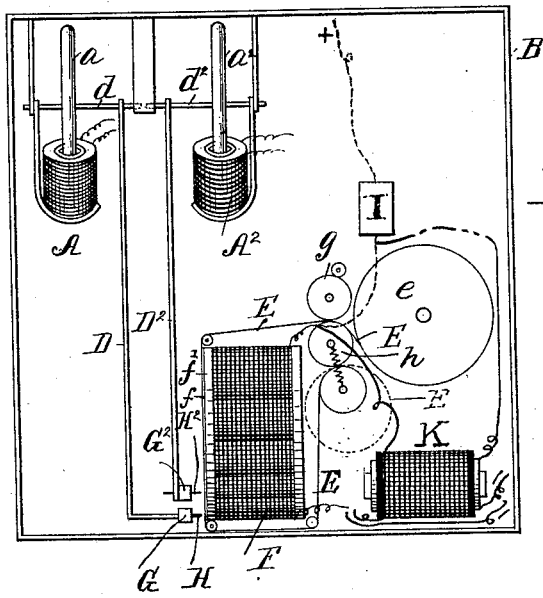
Figure 3:
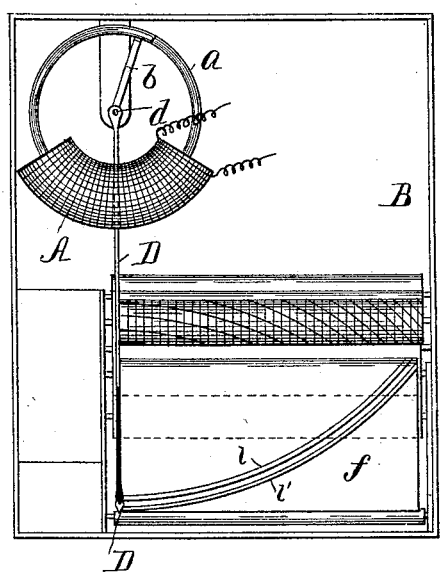
Figure 6:
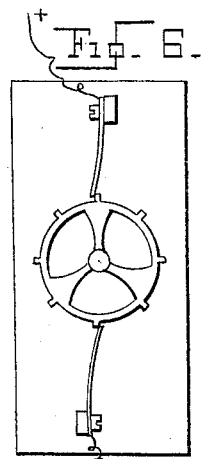
Figure 4:
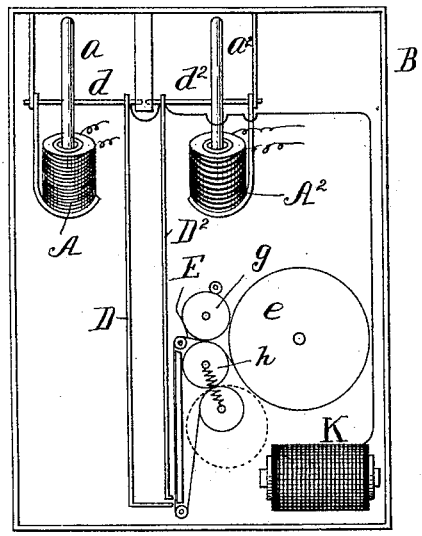
Figure 5:
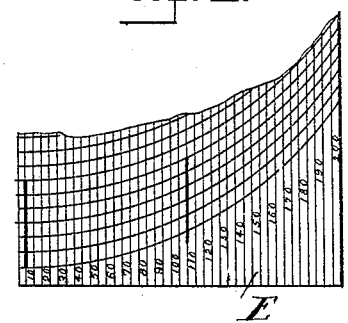

Figure 1 is a face view of the recorder, the front plate being removed. Fig. 2 is a side view thereof. Fig. 3 is a view similar to Fig. 1, showing a different means for marking the record sheet. Fig. 4 is a side view thereof. Fig. 5 is a detail view of a portion of the record sheet, and Fig. 6 is a face view of a circuit breaker used in the instrument. Fig. 7 is a face view of a further form or modification of the recorder; and Fig. 8 is a partial view of a record sheet appropriate thereto.

In the accompanying drawings the letter A indicates a coil suitably held in the casing B, and D is an arm or pointer adapted to be actuated by said coil and to pass over a record sheet E, as shown.

$a$, is an armature for the coil, shown supported by an arm $b$, that is connected with the pivot or arbor $d$ of the arm or pointer D, suitably supported within the casing. The coil A by actuating the armature, causes the arm or pointer D to sweep over the sheet E in the arc of a circle, to a degree corresponding to the intensity of the current.

$A^2$ is a coil or magnet having an armature $a^2$ and an arm or pointer $D^2$, all corresponding to coil A, &c., except that the coil $A^2$ is of as low resistance as possible and that the quantity of the current will be indicated by the arm or pointer $D^2$ as it passes over the sheet E in similar manner. The pivots $d$ and $d^2$ are preferably mounted concentrically or in line as shown in Fig. 2, so that the arms or pointers D, $D^2$, will follow corresponding arcs to indicate on a single record sheet, but it is evident that the arms D, $D^2$, can be mounted to describe their arcs over different surfaces or to indicate on different sheets, suitably arranged side by side in such manner that their indications shall register with each other so as to read together, as described with reference to Figs. 7 and 8. The record sheet E passes from a roll $e$ to roll $h$ over a suitable plate or support $f$, that is beneath the outer parts of the arms or pointers D and $D^2$. Said sheet may be printed as it passes from roll $e$, by a printing roll $g$ whereby it will be provided with suitable numbers and lines to indicate time and the two different electrical units which are to be recorded, and as the sheet is being moved by time mechanism, it will also record the duration of a given indication and present new places upon which to record. Any suitable devices can be employed for this purpose and for a more particular description of a means therefore, I hereby refer to United States Patent No. 462,504, issued to me November 3, 1891.

In order to assist in distinguishing between the lines for ampères and those for volts on the sheet E, the lines on the latter may be contrastingly arranged, say heavy lines to indicate quantity and light lines for tension, or vice versa or otherwise to suit the convenience, not necessary to illustrate. The arms or pointers D, $D^2$, are arranged to impress or mark on the sheet E the different positions they assume under the influence of the current, and for this purpose I have shown in Figs. 1 and 2 a means to perforate the sheet E. In this instance F, F represent one suitably formed or several magnets properly connected, that may be energized at proper intervals and in a convenient way by current from the main line, or by any suitable source, and said magnet or magnets end with a pole-plate $f'$ so that the magnetism will be as evenly as possible divided upon the whole of the arc in which the pointers D and $D^2$ are moving. To allow the perforations or facilitate the necessary impressions, two narrow gaps, $l$ and $l'$, are made in the support plate $f$ just corresponding to the arcs in which the perforations or impressions are to be made. The arms or pointers D, $D^2$ are arranged to vibrate sufficiently and carry armatures G, $G^2$ to be attracted by the pole-plate $f'$, and pins or the like H, $H^2$, are also carried by the arms D, $D^2$ in position to puncture or impress the sheet E when the pole-plate $f'$ attracts the armatures G, $G^2$. When the points of said pins by perforating the record sheet are entering in their respective narrow gaps $l$ and $l'$, on the support plate, they may there come in contact with felt substance, cloth or the like, moistened with differently colored ink so that for instance the one point will make a record of red colored perforations, the other of blue, &c. To effect this, the said cloth can be suitably arranged between the pole-plate $f'$ and the support plate $f$. To distinguish between the records from the different needles, I may also make the one pin bigger than the other whereby the pins will make different records. It will be noticed that the arm D is longer than the arm $D^2$, so that it can freely pass over the sheet without interference and by this means I am enabled to place the pivots of the arms D, $D^2$ in line to cause impressions to be made on the sheet with reference to time in corresponding arcs.

When the recorder is used for its purpose, current will pass through the coils A, $A^2$ and move the arms D, $D^2$ over the sheet E to a degree corresponding to the tension and quantity of the current respectively, while at the same time the pole-plate $f'$ will momentarily attract the armatures G, $G^2$ reiterated times, causing the pins H, $H^2$ to perforate the sheet E. The interrupter or rather the connector being attached to and moved by the time mechanism, the number of said perforations per unit of time can of course be adjusted so as will prove convenient. As the quantity and tension of the current increase or diminish, the arms D, $D^2$, will respectively describe different arcs over the sheet or take different positions while their movements will be recorded by the perforations made in the paper by the pins H, $H^2$, as the latter will be worked rapidly under influence of the momentary magnetic impulses from the pole-plate $f'$.

In Figs. 3 and 4 I have shown means to cause the electric spark to perforate the sheet E for recording the positions that the arms or pointers have taken over the sheet, but as this device is fully described in the Patent No. 462,504 hereinbefore mentioned, I, need not further describe it here. It will however be understood that my present invention indicates both tension and quantity of current by simultaneous action of the parts, whereas in said patent only the quantity of the current is indicated and it cannot be determined from that whether there is a waste of current or whether the current was actually used for the purposes intended. By my present invention I am enabled accurately to account for the exact condition of the current that has passed through the circuit and the duration of the different tensions and quantities. Both the ampères and volts being shown on the sheet E, the resistance can be immediately determined, and therefore I may say that the resistance in the circuit is also practically recorded. The fact that both the tension and quantity of the current are recorded at exactly the same instant, enables me to make the proper calculation. As one arm D or $D^2$ is a little longer than the other, preferably as much as corresponds to five minutes on the record sheet, the record for a given time of the one needle will always be that much less advanced on the record sheet than that of the other needle for the same period. Finally it has to be mentioned that the electro-magnet or magnets F, F may be connected directly to any suitable outside source of current supply though of course where it is necessary the interrupter or connector, may be interposed in the circuit to be measured; or said magnet or magnets may be suitably connected to the secondary circuit of an induction coil K in which latter case the interrupter or connector may be interposed preferably in the primary circuit thereof which then is nourished by aforesaid outside source.

Having now described my invention, what I claim is—

1. An instrument for making a unitary and correlative record of the quantity and tension of an electric current, comprising a record sheet, time mechanism for moving said record sheet, recording needles adapted to move in concentric arcs across the sheet and governed respectively by variations in the quantity and tension of the current, the path of movement of each of said needles being unobstructed by the other and a support for the sheet sufficiently flat to retain the sheet within operative range of the needles at all points of the deviations of the latter produced by the current; substantially as described.

2. An instrument for making a unitary and correlative record of the quantity and tension of an electric current, comprising a record sheet, time mechanism for moving said record sheet, recording needles adapted to move in concentric arcs across the sheet and governed respectively by variations in the quantity and tension of the current, the path of movement of each of said needles being unobstructed by the other mechanism for bringing said needles into intermittent contact only with the sheet so as to avoid undue friction, and a support for the sheet sufficiently flat to retain the sheet within operative range of the needles at all points of the deviations of the latter produced by the current; substantially as described.

3. An instrument for making a unitary and correlative record of the quantity and tension of an electric current, comprising a record sheet, time mechanism for moving said record sheet, recording needles adapted to move in separate arcs across the sheet and governed respectively by variations in the quantity and tension of the current, armatures carried by the ends of the needles, a magnet arranged in the rear of the record sheet and in proximity to the needle end armatures and a circuit breaker for intermittently energizing and deenergizing the magnet, substantially as described.

4. An instrument for making a unitary and correlative record of the quantity and tension of an electric current, comprising a record sheet, time mechanism for moving said record sheet, recording needles adapted to move in separate arcs across the sheet and governed respectively by variations in the quantity and tension of the current, armatures carried by the ends of the needles, a magnet arranged in the rear of the record sheet and in proximity to the needle end armatures and in an arc corresponding to the movement of the marking points of the needles, and a circuit breaker for intermittently energizing and deenergizing the magnet; substantially as described.

5. An instrument for making a unitary and correlative record of the quantity and tension of an electric current, comprising a record sheet, time mechanism for moving said record sheet, recording needles adapted to move in concentric arcs across the sheet and governed respectively by variations in the quantity and tension of the current, the path of movement of each of said needles being unobstructed by the other a support for the sheet sufficiently flat to retain the sheet within operative range of the needles at all points of the deviations of the latter produced by the current, a supply device for feeding the record sheet over the support, and a receiving device for storing up the sheet as it leaves the support; substantially as described.

6. In an electric current recorder the combination of two coils or magnets, armatures therefor, arbors or pivots for the armatures, said arbors being mounted in line arms or pointers connected with said arbors, one of said arms or pointers being longer than the other so that the two will describe concentric arcs a record sheet to indicate the simultaneous and corresponding movements of said arms or pointers respectively, said sheet being moved by time mechanism from a supply device to a receiving device in order to allow a sufficient supply of record surface and records to be made of said movements for a practical and desirable length of time, substantially as described.

7. In an electric current recorder the combination of two coils or magnets, armatures therefor, arbors or pivots for the armatures, said arbors being mounted in line, arms or pointers connected with said arbors, one of said arms or pointers being longer than the other so that the two will describe concentric arcs a record sheet to indicate the simultaneous and corresponding movements of said arms or pointers respectively, said sheet being moved by time mechanism from a supply device to a receiving device in order to allow a sufficient supply of record surface and records to be made of said movements for a practical and desirable length of time and means acting through said arms or pointers periodically to mark the sheet, substantially as described.

8. In an electric current recorder the combination of a vibrating arm or pointer, a coil or magnet for moving it along a record sheet, moved by time-mechanism, an armature carried by the vibrating free end of said arm or pointer, an electro-magnet for moving said armature and means carried by said arm or pointer to mark said sheet, substantially as described.

9. In an electric current recorder the combination of a vibrating arm or pointer, a coil or electro-magnet for moving it along a record surface, moved by time-mechanism, an armature carried by the vibrating free end of said arm or pointer another electro-magnet for moving said armature, means carried by said arm or pointer to mark said sheet and a connector or interrupter moved by time-mechanism to determine the number of marks, substantially as described.

JOHAN W. TH. OLÁN.

Witnesses:
JOHN L. CURTIS,
WM. H. DE LACY.